(12) United States Patent
Spitz et al.

(10) Patent No.: US 8,690,190 B2
(45) Date of Patent: Apr. 8, 2014

(54) WORK VEHICLE WITH ENGINE MOUNTED REARWARDLY

(75) Inventors: David Spitz, Atlanta, GA (US);
Masahiro Yamada, Norcross, GA (US);
Takeshi Komorida, Duluth, GA (US);
Takashi Shibata, Duluth, GA (US)

(73) Assignee: Kubota Corporation, Osaka (JP)

( * ) Notice: Subject to any disclaimer, the term of this patent is extended or adjusted under 35 U.S.C. 154(b) by 61 days.

(21) Appl. No.: 13/423,551

(22) Filed: Mar. 19, 2012

(65) Prior Publication Data
US 2013/0240283 A1  Sep. 19, 2013

(51) Int. Cl.
*F02M 33/02* (2006.01)

(52) U.S. Cl.
USPC .......................... 280/834; 180/6.48; 123/519

(58) Field of Classification Search
USPC .......................... 280/834; 180/6.48; 123/519
See application file for complete search history.

(56) References Cited

U.S. PATENT DOCUMENTS

| | | | | |
|---|---|---|---|---|
| 4,741,362 A | * | 5/1988 | Smola | 137/587 |
| 6,454,032 B1 | * | 9/2002 | Teal et al. | 180/6.62 |
| 7,849,837 B2 | | 12/2010 | Hasebe et al. | |
| 8,277,528 B2 | * | 10/2012 | Umemoto et al. | 55/385.3 |
| 2002/0112907 A1 | * | 8/2002 | Maeda et al. | 180/69.4 |
| 2007/0246929 A1 | * | 10/2007 | Isayama et al. | 280/834 |
| 2010/0242924 A1 | | 9/2010 | Ochi et al. | |

* cited by examiner

*Primary Examiner* — Kevin Hurley
*Assistant Examiner* — Michael Stabley
(74) *Attorney, Agent, or Firm* — Greenblum & Bernstein, P.L.C.

(57) ABSTRACT

A work vehicle includes a vehicle frame extending between a right and left pair of rear wheels. An engine is mounted in a vertical position on a horizontal mounting surface defined in the vehicle frame in a peripheral area of the rear wheels in a central portion of a transverse direction of the vehicle. A fuel tank includes a main tank body mounted under a driver's seat and an auxiliary tank body mounted on the mounting surface on one lateral side of the engine in the transverse direction of the vehicle. A canister is mounted adjacent to the engine on one lateral side of the engine and rearwardly of and adjacent to the auxiliary fuel tank.

19 Claims, 11 Drawing Sheets

WORK VEHICLE WITH ENGINE MOUNTED REARWARDLY

TECHNICAL FIELD

The present invention relates to a work vehicle including an engine and a fuel system mounted in a rear area of a vehicle frame extending between a right and left rear wheels rearwardly of a driver's seat.

BACKGROUND ART

U.S. Patent Application Publication No. US 2010/0242924 discloses a lawn mower including a rear frame formed of a right and left pair of side members made of sheet metal and a mounting surface supported rearwardly of the right and left side members, for example. An air-cooled engine is mounted on the mounting surface with an output shaft thereof projecting forward of a vehicle body. A muffler is disposed in a transverse position rearwardly of the engine. Fuel tanks are provided above the right and left rear wheels, respectively, to act as a fuel system. Evaporated gas separator tanks and canisters are disposed between the fuel tanks and the engine to allow fuel gas evaporated within the fuel tanks to combust in the engine. Each of the evaporated gas separator tanks is configured to recover fuel gas having evaporated within the fuel tank and direct it to the canister, and is disposed in a gas passageway between each fuel tank and each canister. The canisters are provided under the right and left fuel tanks in association with the right and left fuel tanks, respectively, to be distributed in the right and left sides of a rear portion of an oil cooler in a cooling air passageway at positions that are spaced from each other substantially equidistantly from a lateral center line of a traveling vehicle body. In such a conventional fuel system, it is required to provide long hoses for connecting between the fuel tanks, canisters and engine, which results in a complicated hose arrangement.

Further, U.S. Pat. No. 7,849,837 discloses a lawn mower provided with a fuel system for performing evaporated fuel processing. Type of lawn mower includes a fuel tank disposed on a side of an engine mounted rearwardly of a vehicle frame, and a battery unit fixed to the vehicle frame rearwardly of the engine. On the fuel tank is mounted a canister communicating with an upper inner space of the fuel tank. The canister has a purge conduit extending from the opposite side of a port communicating with the fuel tank and fixed to a purge joint at a lower end thereof. In this arrangement, the canister is provided above the fuel tank, which inevitably limits a space for accommodating the canister. As a result, restrictions may be imposed in the size as well as the maintenance and inspection of the canister.

SUMMARY OF INVENTION

The object of the present invention is to provide a work vehicle in which an engine and a fuel system are properly arranged for improving effective use of space and achieving simplification of the maintenance and inspection.

In order to achieve the above-noted object, a work vehicle according to the present invention comprises a vehicle frame extending between a right and left pair of rear wheels; a horizontal mounting surface defined in the vehicle frame in a peripheral area of the rear wheels; an engine arranged on the mounting surface at a central portion thereof in a transverse direction of the vehicle; a fuel tank including a main tank body mounted under a driver's seat and an auxiliary tank body mounted on one lateral side of the engine in the transverse direction of the vehicle; and a canister mounted on the mounting surface adjacent to the engine on one lateral side of the engine and rearwardly of and adjacent to the auxiliary fuel tank.

With the above-noted arrangement, the fuel tank is divided into the main tank body and the auxiliary tank body that are provided spacious areas, respectively, such as under the driver's seat and the side of the engine, as a result of which good efficiency of spatial use can be achieved. Further, the fuel tank, vertical engine and canister are adjacently provided so that they do not substantially overlap each other as viewed from the top. Since the particularly heavy engine is provided vertically in the central portion in the transverse direction of the vehicle, the stability of the work vehicle is secured. Further, the engine, fuel tank and canister are adjacently disposed, which can diminish a piping layout extending between those devices. In addition, the fuel tank is divided into the main tank body mounted under the driver's seat and the auxiliary tank body mounted adjacent to the fuel tank and the canister to effectively use the space, which provides a large capacity for the fuel tank.

In a preferred embodiment, at least a large part of the main tank body is covered by the driver's seat, thereby to protect the main tank portion. Further, the auxiliary tank portion is allowed to extend upwardly from a side of the driver's seat, which improves the oil-feeding performance.

When a battery unit is provided rearwardly of the canister in view of the size of the canister smaller than the engine, the canister and the battery unit are longitudinally arranged, which further miniaturizes the construction.

In addition, a muffler is mounted on the other lateral side of the engine, that is a side of the vehicle, which enhances thermal isolation and cooling properties of the muffler.

DESCRIPTION OF EMBODIMENTS

Figure 1:
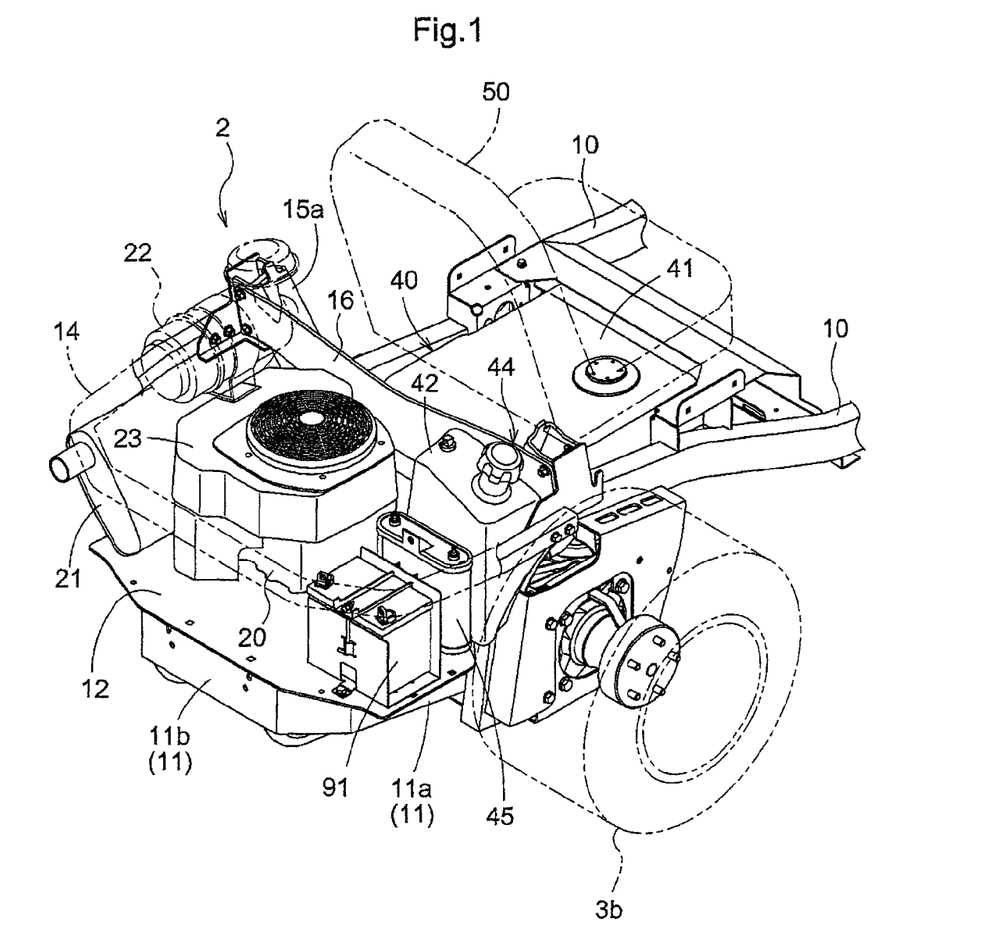
FIG. 1 is a perspective view from an upper diagonal direction of a work vehicle according to the present invention showing a basic arrangement of an engine and a fuel system mounted in a rear area of the vehicle.

Prior to describing specific embodiments of a work vehicle according to the present invention, a basic arrangement of an engine and a fuel system mounted in a rear area of the vehicle will be described first in reference to schematic views shown in FIGS. 1 and 2.

In the rear area of the vehicle are included a right and left pair of rear wheels 3b and a rear frame 11 acting as a vehicle frame extending between the rear wheels 3b. A driver's seat 50 is arranged slightly forwardly of a center of an axle of the rear wheels, which is only partially depicted in two-dot chain line to provide good visibility for other devices.

A substantially horizontal mounting surface 12 is defined in the rear frame 11 in a peripheral area of the rear wheels 3b, which is formed of a floor material mounted on the rear frame 11 in this example. The engine 20 is mounted in a vertical position, with an output shaft thereof being directed downward, on the mounting surface 12 in a central portion of a transverse direction of the vehicle, rearwardly of the center of the axle of the rear wheels 3b. A fuel tank 40 is arranged forwardly of and adjacent to the engine 20.

The fuel tank 40 includes a main tank body 41 mounted under the driver's seat 50, and an auxiliary tank body 42 mounted on one lateral side, on the right side in the illustrated example, of the engine 20 in the transverse direction of the vehicle. The main tank body 41 has a rectangular shape with substantially the same width as the driver's seat 50 and a length greater than that of the driver's seat 50 to provide a large capacity in spite of its small depth to effectively use a space under the driver's seat 50 limited vertically. The auxiliary tank body 42 communicates with the main fuel tank 41, extending vertically on a lateral side area of the engine 20 rearwardly of the driver's seat 50. A cylindrical oil-feeding unit 44 is provided in a top portion of the auxiliary tank body 42 with a fuel cap.

A canister 45 is mounted on the mounting surface 12 adjacent to the engine 20 on one lateral side (the right side in this example) of the engine 20 and rearwardly of and adjacent to the auxiliary fuel tank 43. A canister connecting port 42b is provided in the top portion of the auxiliary tank body 42 to be connected to the canister 45 through a tube or hose. Although not shown, the canister 45 is also connected to an air intake system of the engine 20 through a tube or hose. Since the engine 20, auxiliary tank body 42 and canister 45 are adjacently arranged so that they do not overlap as viewed from the top, the tubes or hoses for connecting those devices may be shortened, which results in a compact piping layout.

Apart from the above-noted engine 20, auxiliary tank body 42 and canister 45, on the mounting surface 12 are mounted a muffler 21 on the other lateral side, the left side in this example, of the engine 20, and a battery unit 91 directly rearwardly of the canister 45. A bent, outer pipe frame 14 having a C-shape as viewed from the top is mounted to surround those devices above the mounting surface 12. The outer pipe frame 14 is connected at opposite ends thereof to right and left vertical frames 13 extending upwardly from the rear frame 11 rearwardly of the driver's seat 50. Control cables are housed in an inner space of the outer pipe frame 14. The control cables include a cable for adjusting rotational speed of the engine 20, for example.

A partition 16 is preferably provided to separate between an engine area and a driver's area in a longitudinal direction of the vehicle in order to prevent heated air from blowing directly into the driver's seat 50. Since the fuel tank 40 divided into the main tank body 41 and auxiliary tank body 42 extends over a boundary between the engine area and driver's area, it is preferable to allow the partition 16 to act as a retaining member to hold down the fuel tank 40 from above.

Figure 3:
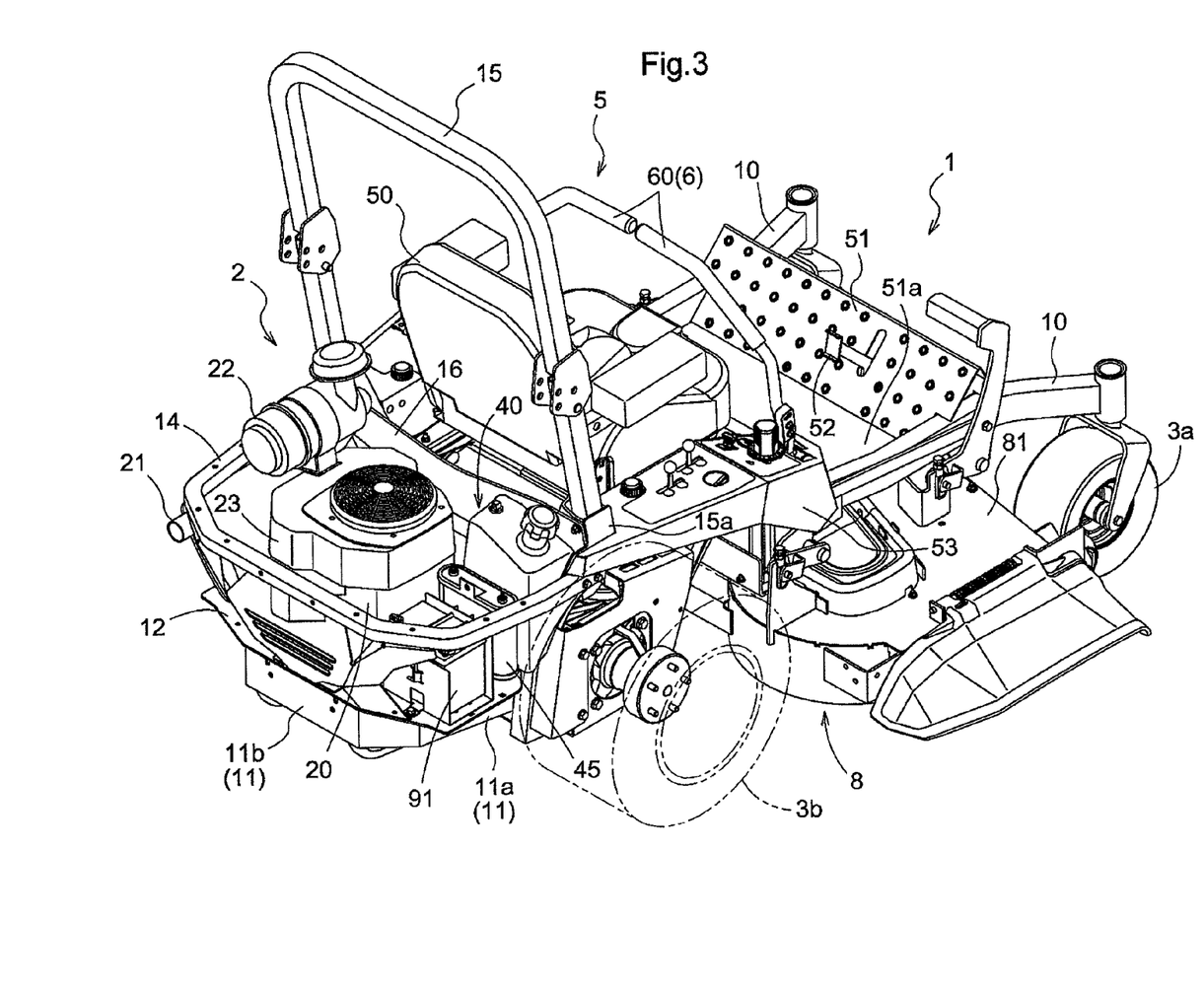
FIG. 3 is a perspective of a lawn mower exemplifying the work vehicle according to the present invention.
Figure 4:
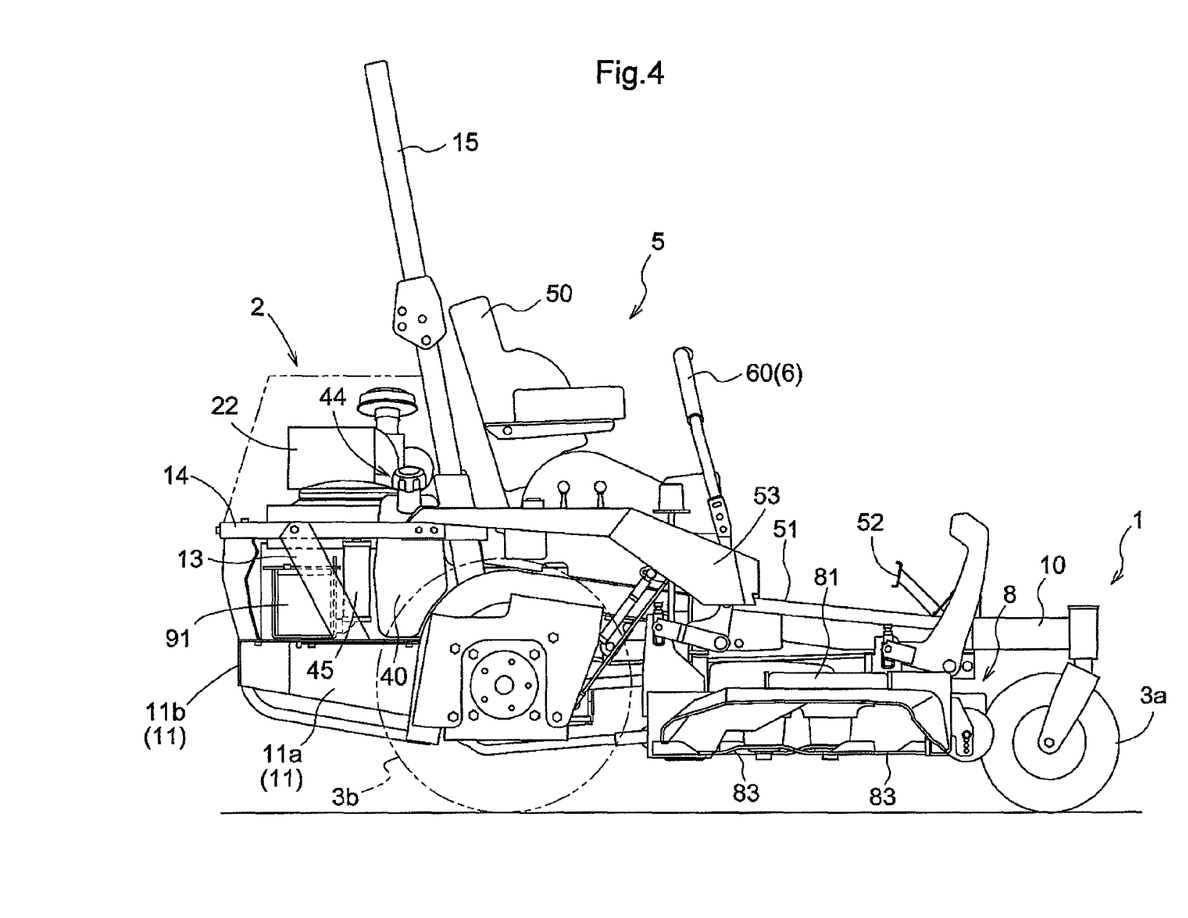
FIG. 4 is a side view of the lawn mower in FIG. 3.
Figure 5:
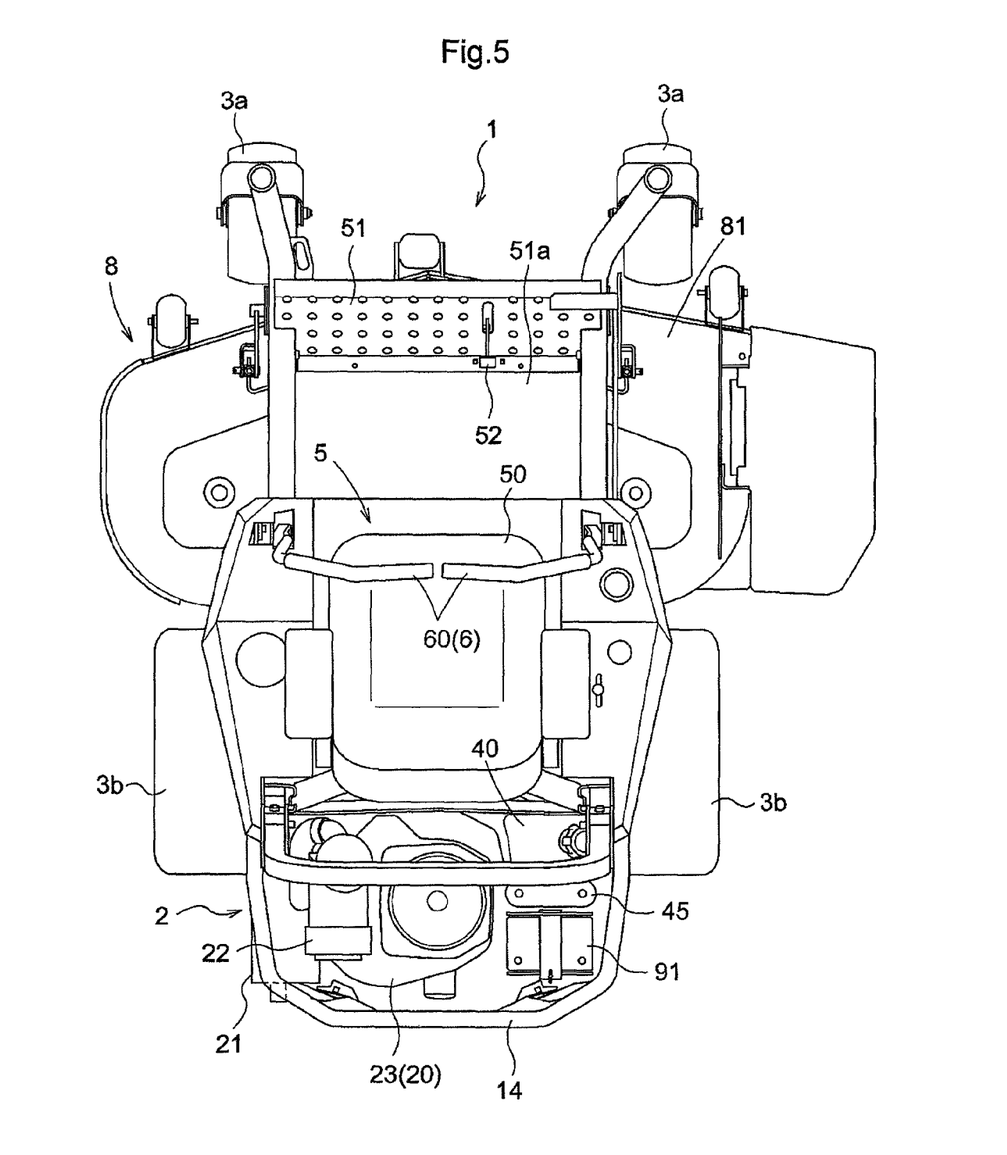
FIG. 5 is a top plan view of the lawn mower in FIG. 3.

The specific embodiments of the present invention will be described hereinafter in reference to the accompanying drawings. As shown in FIGS. 3 and 5, the work vehicle according to the present invention is represented by a ride-on lawn mower including a vehicle body 1 supported to a right and left pair of front wheels 3a and a right and left pair of rear wheels 3b. This type of ride-on lawn mower is also referred to as a zero-radius-turning mower, in which the right and left rear wheels 2b are independently controlled in forward/reverse drive speed. FIG. 3 is a diagonal rear perspective view of the ride-on lawn mower, FIG. 4 is an overall side view thereof, and FIG. 5 is an overall top plan view thereof.

The vehicle body 1 includes a front frame 10 and a rear frame 11 made of square pipe material, for example, as main components. A mower unit 8 is suspended from the front frame 10 between the right and left pair of front wheels 3a and the right and left pair of rear wheels 3b to be vertically movable through an unillustrated link mechanism. The link mechanism functions to vertically move the mower unit 8 in a horizontal position through pedal control and lever control.

A boarding platform 51 made of sheet metal is provided to substantially cover the entire front frame 10 from above. The boarding platform 51 has a forwardly inclined surface formed by bending a front portion of the platform, and a horizontal surface continued from the inclined surface. A rubber mat 51a is laid over the horizontal surface, and a brake pedal 52 urged to return to a non-braking position is arranged in a central portion of the inclined surface. A driver's seat 50 is positioned one level higher rearwardly of the boarding platform 51. Fenders 53 and handle units 6 having shift levers 60 are provided in lateral opposite sides of the driver's seat 50, respectively. Various control levers and control buttons are arranged on a top surface of each fender 53. A gate-shaped ROPS frame 15 vertically extends rearwardly of the driver's seat 50. The ROPS frame 15 is made of square pipe material and is longitudinally bendable about a transverse axis at intermediate portions of right and left ROPS struts 15a. More particularly, the ROPS frame 15 is switchable between an upright standing position and a rearward lying position. In this type of ride-on lawn mower, a front area forwardly of the ROPS frame 15 of the vehicle body 1 is defined as a driver's section 5, while a rear area rearwardly of the ROPS frame 15 of the vehicle body 1 is defined as a drive section 2.

The rear frame 11 has an arched shape as viewed from the top with a right and left pair of straight frame portions 11a extending longitudinally in the vicinity of the rear wheels 3b and a curved frame portion 11b projecting rearward for connecting the right and left straight frame portions 11a to each other. A substantially horizontal mounting surface 12 for receiving various devices constituting the drive section 2 is defined on the arched rear frame 11 rearwardly of the driver's seat 50, which is formed as a top surface of a floor material mounted on the rear frame 11 in the current embodiment. Vertical frames 13 extend from an upper portion of the rear frame 11 to be spaced from each other by a predetermined interval. An outer pipe frame 14 having a similar shape to the contour of the rear frame 11 is attached to upper portions of the vertical frames 13.

Figure 6:
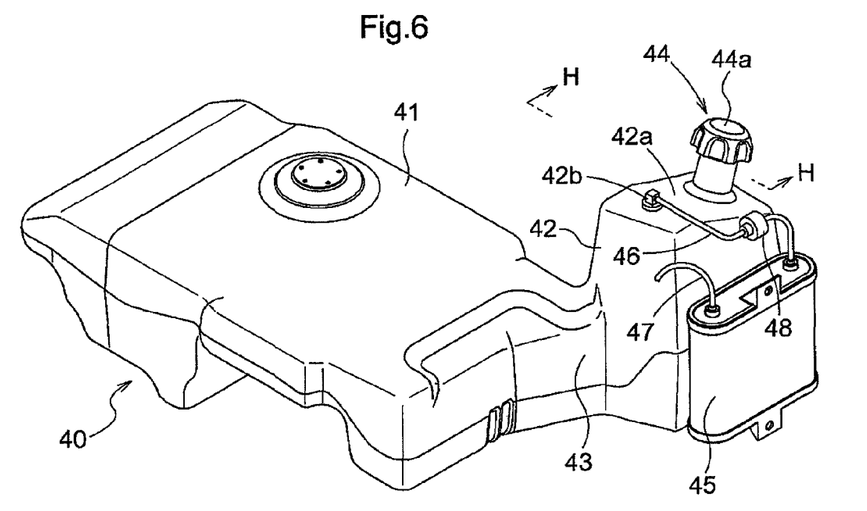
FIG. 6 is a perspective view of the fuel tank.
Figure 7:
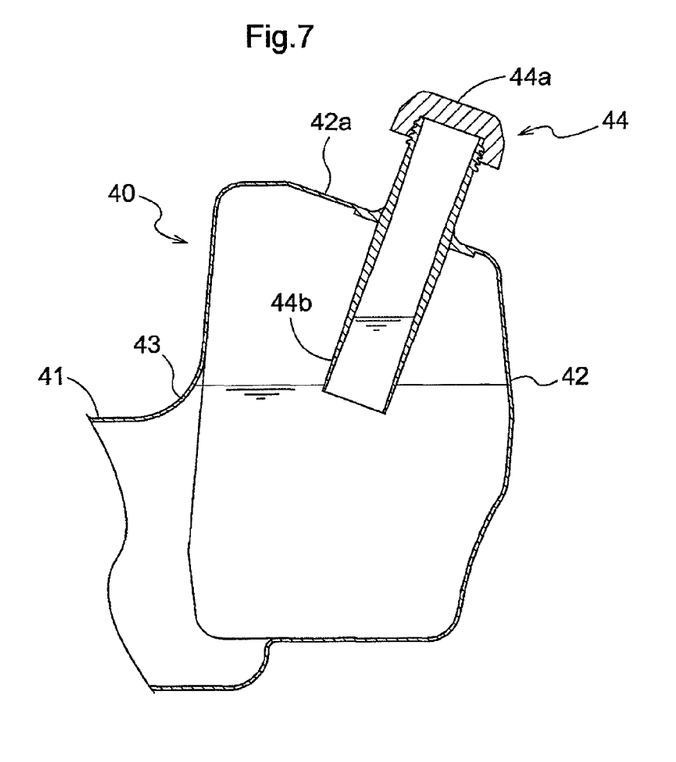
FIG. 7 is a sectional view of an auxiliary tank body of the fuel tank.
Figure 8:
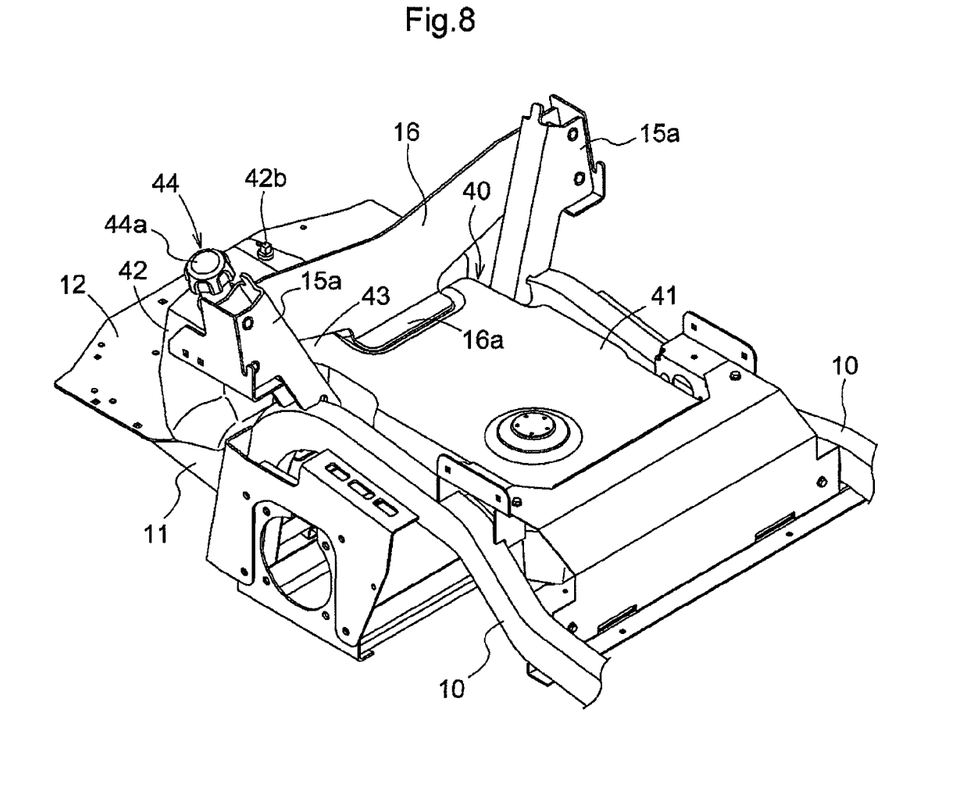
FIG. 8 is a top plan view showing a mounting structure of the fuel tank.

In the central part of the mounting surface 12 is mounted a gas engine 20 with an output shaft thereof projecting downward. A fuel tank 40 is mounted over a region from a front area to a right-side area of the engine 20. As shown in FIGS. 6 to 8, the fuel tank 40 consists of a main tank body 41 mounted under the driver's seat 50 forwardly of the engine 20, an auxiliary tank body 42 extending vertically on the right side of the engine 20 rearwardly of the driver's seat 50, and a neck-like transitional portion 43 connecting the main tank body 41 to the auxiliary tank body 42. The main tank body 41 has a flat top surface and thus can be arranged efficiently along a lower surface of the driver's seat 50. The auxiliary tank body 42 has a rectangular section elongated transversely of the vehicle body as viewed from the top and extends higher than the main tank body 41 with a top portion 42*a* thereof positioned at a level beyond the outer pipe frame 14. An oil-feeding unit 44 is provided in a portion of the top portion 42*a* transversely outward of the vehicle body, while a canister connecting port 42*b* is provided in a portion of the top portion 42*a* transversely inward of the vehicle body (on the side adjacent to the engine). The oil-feeding unit 44 consists of an oil-feeding pipe 44*b* inserted into a hole formed in a top surface of the top portion 42*a*, and a fuel cap 44*a* attached to a distal end of the oil-feeding pipe 44*b*. As understood from FIG. 7 representing a sectional view taken on line H-H of FIG. 6, the oil-feeding pipe 44*b* has a lower end positioned above a maximum height of the main tank body 41. Since the canister connecting port 42*b* is provided substantially the highest position of the top surface of the top portion 42*a*, an upper space of the auxiliary tank body 42 including the oil-feeding pipe 44*b* is an air layer. Pressure in the air layer is maintained in a predetermined range by a two-way valve 48 disposed in a fuel gas conduit (hose) 46 extending from the canister connecting port 42*b*. Thus, the air layer is maintained regardless of regular change of the position of the vehicle body, which prevents a fuel from entering the canister connecting port 42*b*.

A canister 45 is placed on the mounting surface 12 adjacent to a rear side of the auxiliary tank body 42. The canister 45 is connected to an air intake system of the engine 20 through a purge conduit (hose) 47, and is connected to the canister connecting port 42*b* through a fuel gas conduit (hose) 46. As the two-way valve 48 is disposed in the fuel gas conduit 46, an air layer is secured above the auxiliary tank body 42 when a fuel is supplied, and pressure regulation is performed through the canister 45 when internal pressure of the tank is increased, or decreased with use of the fuel.

Figure 2:
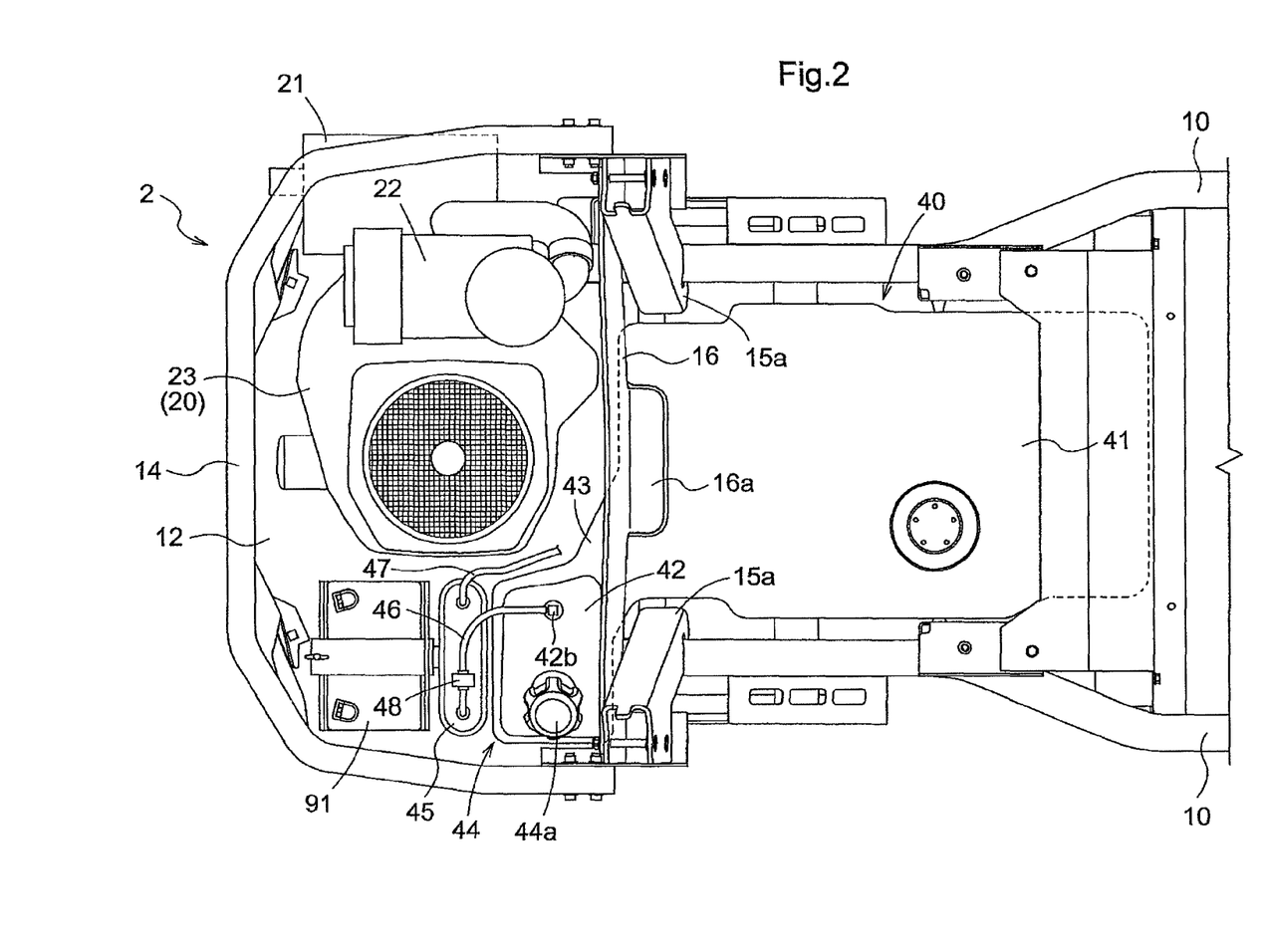
FIG. 2 is a top plan view of the basic arrangement of the engine and the fuel system mounted in the rear area of the vehicle.

In addition, a battery unit 91 is placed on the mounting surface 12 adjacent to a rear side of the canister 45 (see FIG. 2). Further, a muffler 21 is placed on the mounting surface 12 on the opposite side of the battery unit 91 across the engine 20, that is, on the left side of the engine 20. A side portion of the muffler 21 faces an opening formed between the vertical frames 13, and thus can be effectively cooled. An air cleaner 22 is mounted in a position higher than the engine 20 on the left side of the engine 20. An engine cooling fan is provided above the engine 20 to be rotatable in unison with the output shaft 20*a* of the engine 20, which is hidden in the drawings by an air-introducing housing for covering the engine cooling fan from above.

Figure 9:
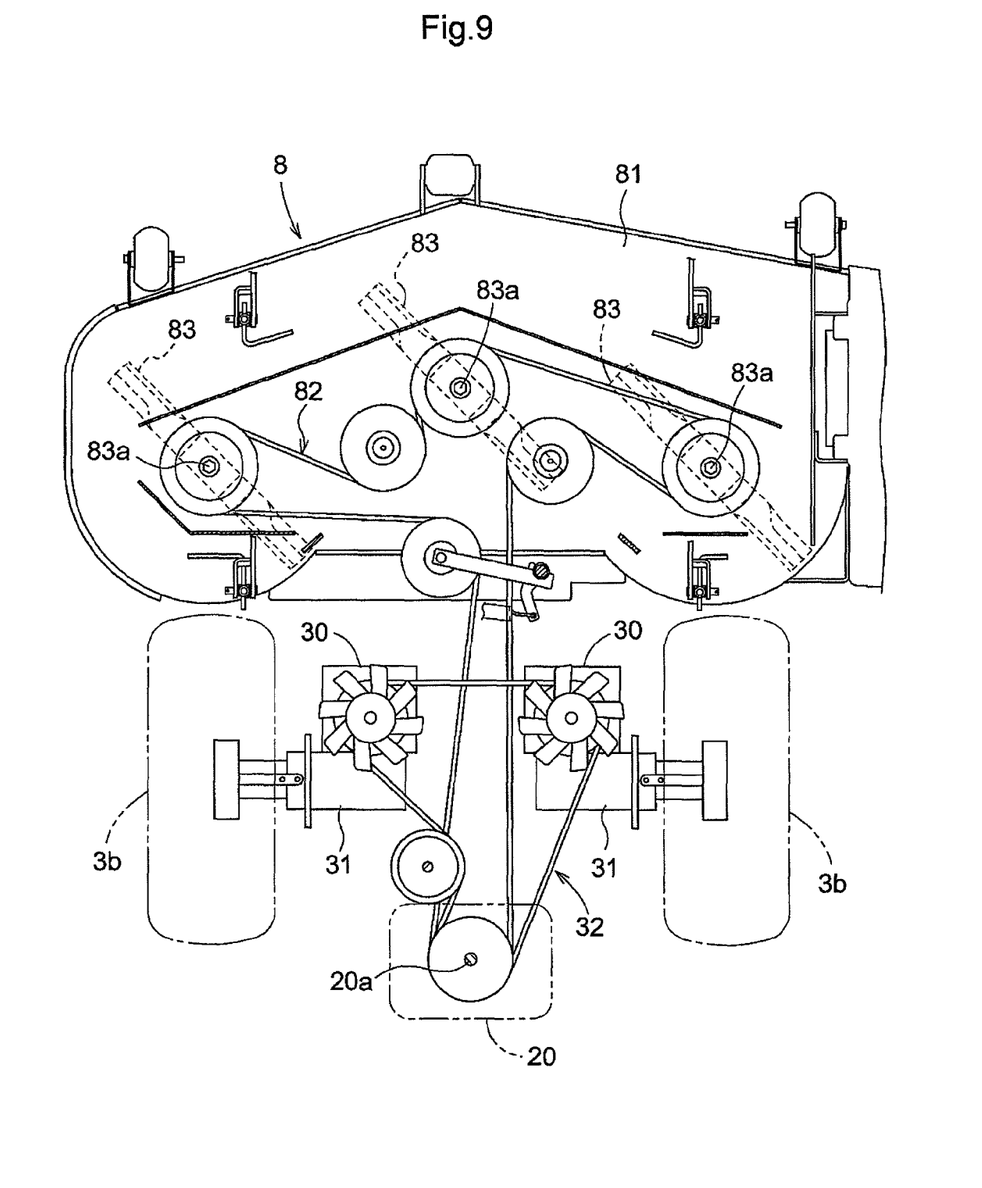
FIG. 9 is a schematic view showing a power transmission system.

In association with each of the right and left rear wheels 3*b*, an HST (hydrostatic transmission) 30 and a gear transmission mechanism 31 for transmitting drive power to the rear wheel 3*b* are provided as shown in FIG. 9. A propelling-line belt transmission mechanism 32 includes pulleys mounted between the output shaft 20*a* of the engine and the respective HSTs 30 so that output from the engine is transmitted to each HST. A shift control shaft for each HST (not shown) is linked to an associated shift lever 60 through a control link mechanism so that shifting operation is performed in response to longitudinal oscillating movement of each of the shift levers 60 mounted directly forwardly and laterally of the driver's seat 50 (see FIG. 5).

With the above arrangement, either of the right and left shift levers 60 is oscillated longitudinally to shift the HST 30 associated with the oscillated shift lever 60, which allows the right and left rear wheels 3*b* to be independently speed changed. More particularly, in this type of ride-on lawn mower, the right and left front wheels 3*a* are followably steered while the right and left rear wheels 3*b* are independently driven for speed change, thereby to desirably produce a stop state for stopping the right and left rear wheels 3*b*, a straight-forward traveling state for driving the right and left rear wheels 3*b* forwardly or reversely at the same speed, a gentle-turn state for driving the right and left wheels 3*b* forwardly or reversely at different speeds, a pivot-turn state for stopping one of the right and left rear wheels 3*b* while driving the other of them forwardly or reversely, and a spin-turn state for driving one of the right and left rear wheels 3*b* forwardly while driving the other of them reversely.

The mower unit 8 is suspended from the front frame 10 between the right and left pair of front wheels 3*a* and the right and left pair of rear wheels 3*b* to be vertically movable through the link mechanism 80. The mower unit 8 includes three blades 83 arranged in the transverse direction of the vehicle body within a mower deck 81. Each of the blades 83 is fixed to a drive shaft 83*a* supported to the mower deck 81. A mower-unit belt transmission mechanism 82 is provided to include pulleys mounted on the output shaft 20*a* of the engine 20 and each drive shaft 83*a*, in which output from the engine 20 is transmitted to the mower unit 8. As understood well from FIG. 9, the propelling-line belt transmission mechanism 32 and the mower-unit belt transmission mechanism 82 use the output shaft 20*a* of the engine 20 as an input shaft, and arranged at different levels independently of each other planarly. This arrangement allows constant-speed drive power to be transmitted to the mower unit 8 regardless of a traveling speed or traveling state.

The fuel tank 40 is positioned under the driver's seat 50 without any mounting bracket to be fixed to the vehicle body. As shown in FIG. 8, the fuel tank 40 is mounted on a cross plate mounted on the rear frame 11 through an elastic member such as rubber and laterally positioned through a projecting elastic member attached to the rear frame 11. The main tank body 41 has a forward portion held down by a coupling plate for connecting the right and left fenders 53 to each other, and a rearward portion, more particularly, a region around the transitional area 43, held down by a plate-like retaining member 16 from above. The retaining member 16 is configured to section between an engine area and a driver's area in the longitudinal direction of the vehicle body to also act as a partition in order to prevent heated air from the engine 20 from blowing into directly to the driver's seat 50. Thus, the retaining member (partition) 16 has a transverse dimension and a vertical dimension (height) over the entire width of the vehicle body and is fixed at opposite ends thereof to proximal end portions of the ROPS struts 15*a*. A tongue-like piece 16*a* bent horizontally is provided in a central lower end of the retaining member 16 to fit into a recess formed in the transitional portion 43 between the main tank body 41 and the auxiliary tank body 42, thereby to hold down the fuel tank 40.

Various levers and switches are provided in the top surfaces of the fenders 53 positioned laterally of the driver's seat 50. As apparent from FIGS. 3 to 5 showing an external appearance of the vehicle, this type of ride-on mower does not include a hood for covering the engine area. Naturally, such a hood may be provided.

Modified Embodiments (1) In the first embodiment, the muffler 21 is placed on the side of the engine 20 along the longitudinal direction of the vehicle body. Instead, as shown in a modification of the ride-on lawn mower in FIG. 10, the muffler 21 may be placed rearwardly of the engine 20 along the transverse direction of the vehicle body.

Figure 10:
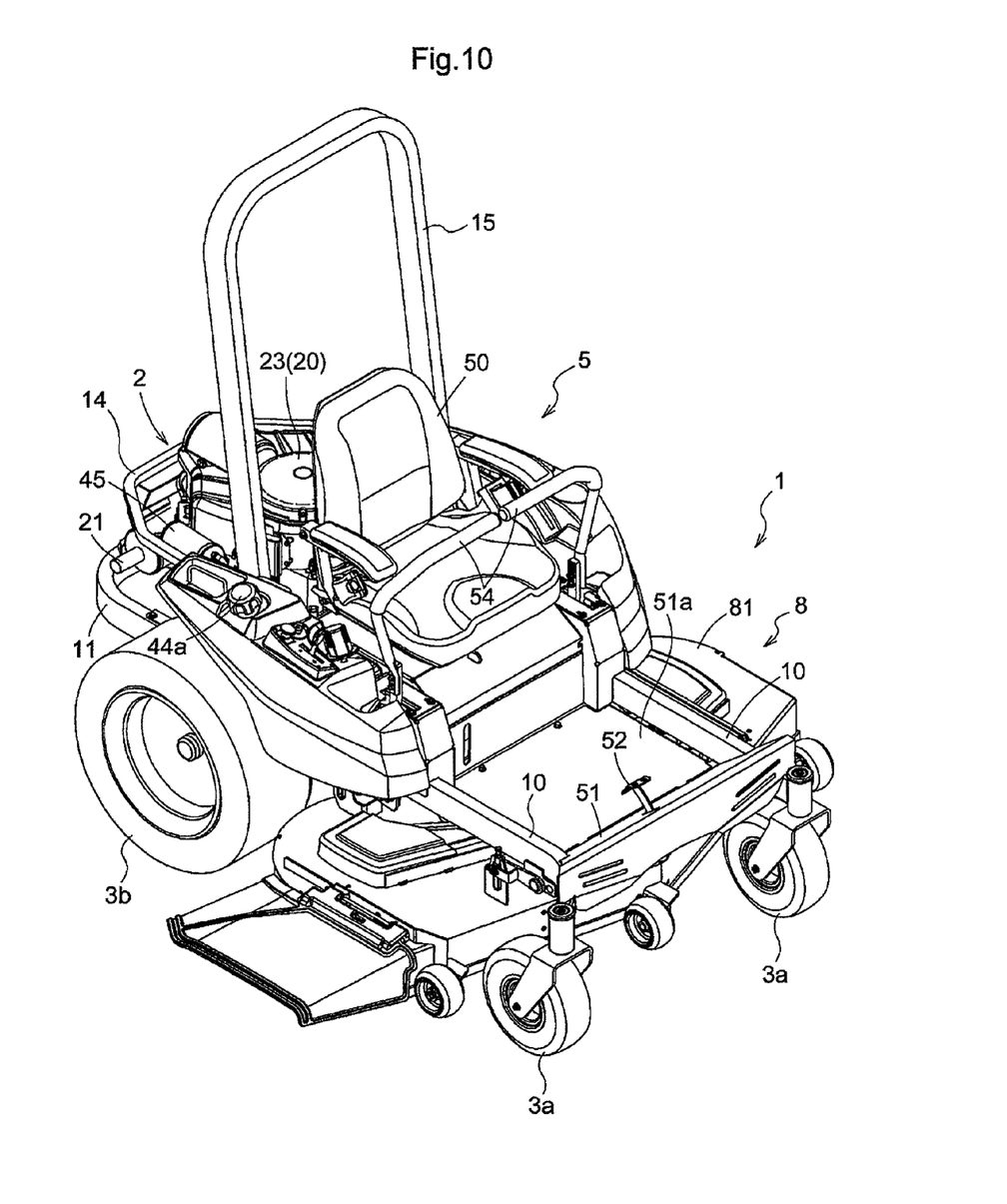
FIG. 10 is a perspective view of a lawn mower according to a modified embodiment of the present invention.

(2) In the first embodiment, the fuel tank 40 is held down from above by the retaining member 16 acting also as the partition extending transversely of the vehicle body. Instead, the partition and retaining member 16 may be separately provided. As shown in FIG. 10, for example, the main tank body 41 may be held down from above by a rod-like retaining member 16A extending between cross members mounted forwardly and rearwardly of the main tank body 41. In that case, the cross member mounted rearwardly of the main tank body 41 may act as a partition 16B.

Figure 11:
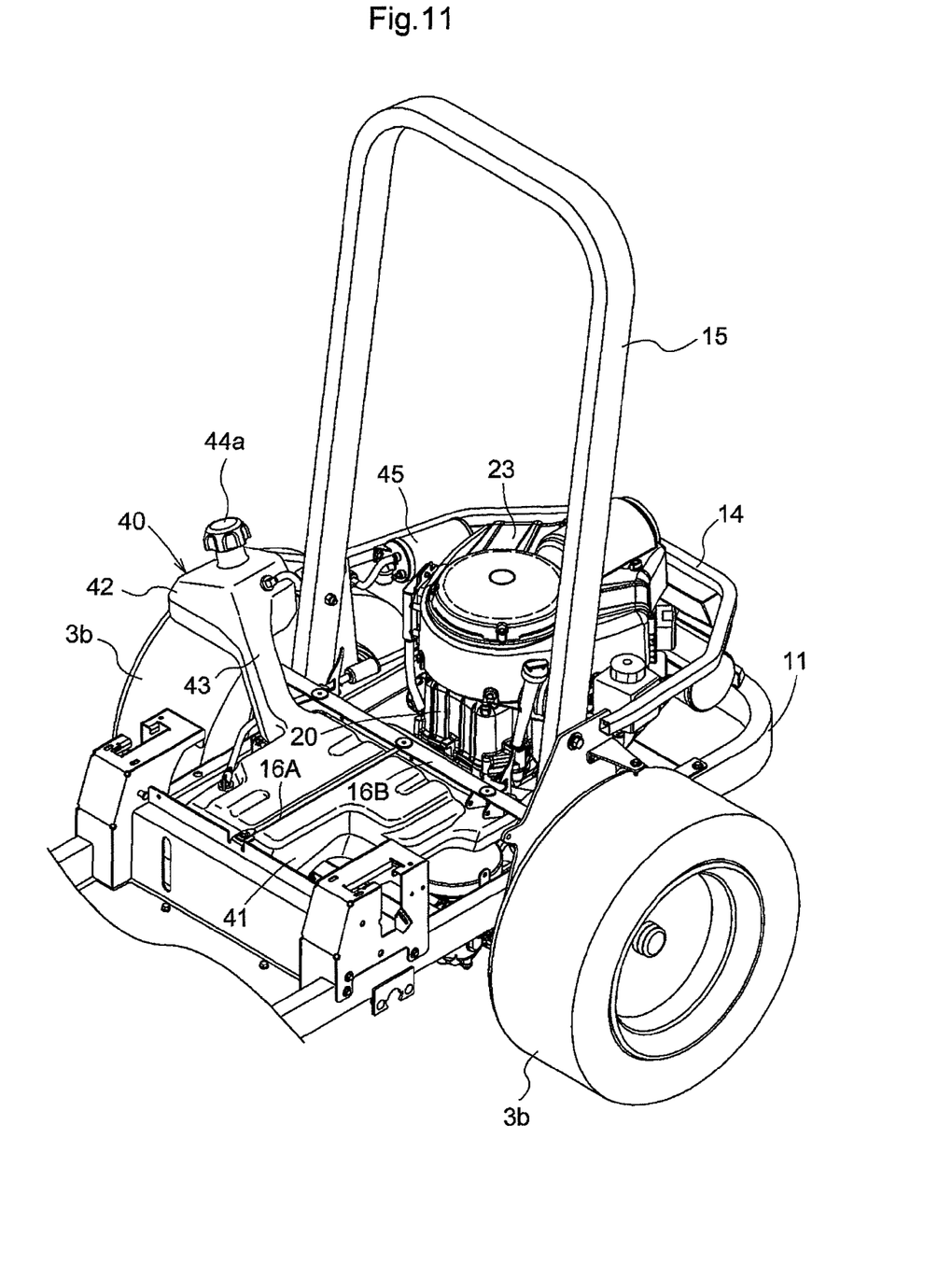
FIG. 11 is a perspective view showing a mounting structure of the fuel tank according to a further modified embodiment of the present invention.
Figure 12:
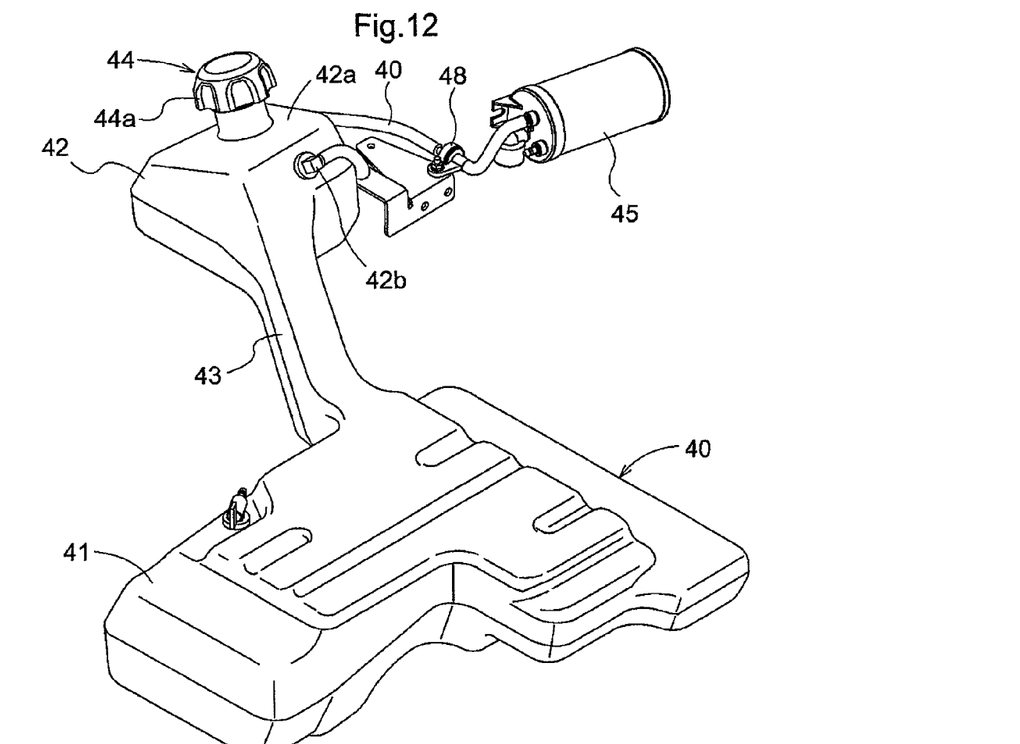
FIG. 12 is a perspective view of the fuel tank according to the further modified embodiment of the present invention.
Figure 13:
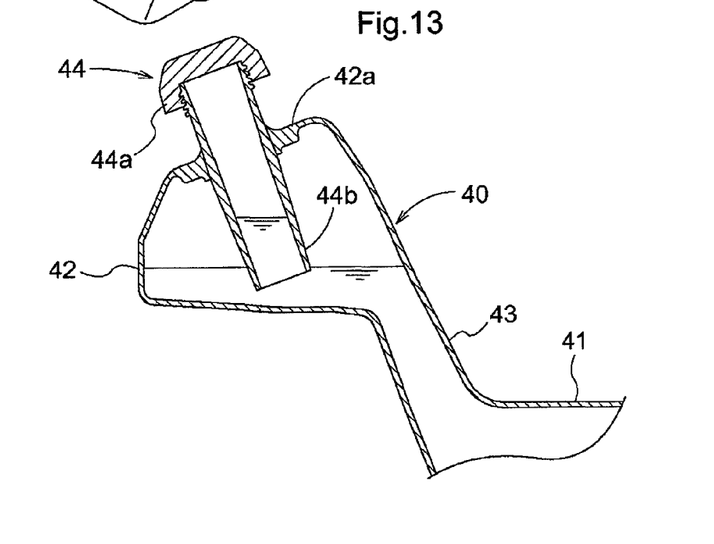
FIG. 13 is a perspective view of the auxiliary tank body of the fuel tank according to the further modified embodiment of the present invention.

(3) The fuel tank 40 shown as being mounted on the vehicle body in FIG. 11 while shown solely in FIG. 12 has a slightly different construction than that in the first embodiment. While the fuel tank 40 consists of the main tank body 41, auxiliary tank body 42 and transitional portion 43 in the same way as the first embodiment, the transitional portion 43 extends upward to incline outwardly in the transverse direction of the vehicle body in order to position the auxiliary tank body 42 farther outwardly in the transverse direction of the vehicle body. In this modified mode as well, the oil-feeding unit 44 and canister connecting port 42b are provided in the top portion 42a of the auxiliary tank body 42 that is positioned at a level far higher than the main tank body 41. The oil-feeding unit 44 according to the modified embodiment also consists of the oil-feeding pipe 44b inserted into the hole formed in the top surface of the top portion 42a, and the fuel cap 44a attached to the distal end of the oil-feeding pipe 44b. As understood from FIG. 13, the oil-feeding pipe 44b has the lower end positioned above a maximum height of the transitional portion 43 extending upwardly further from the main tank body 41. In addition, since the canister connecting port 42b is provided substantially the highest position of the top surface of the top portion 42a, an upper space of the auxiliary tank body 42 including the oil-feeding pipe 44b is an air layer. In this modified embodiment as well, pressure in the air layer is maintained in a predetermined range by the two-way valve 48 disposed in the fuel gas conduit (hose) 46 extending from the canister connecting port 42b. Thus, the air layer is maintained regardless of regular change of the position of the vehicle body, which prevents the fuel from entering the canister connecting port 42b. As a result, the fuel enters the canister 45 less easily even in the sloping ground.

(4) In the first embodiment, the present invention is applied to a mid-mount lawn mower. Instead, the present invention is also applicable to a front-mount lawn mower or work vehicles other than the lawn mower.

INDUSTRIAL USABILITY

The present invention is applicable to a work vehicle with an engine and a fuel system mounted rearwardly.

What is claimed is:
1. A work vehicle comprising:
a vehicle frame extending between right and left rear wheels;
a horizontal mounting surface defined in the vehicle frame in an area of the rear wheels;
an engine arranged on the mounting surface at a central portion thereof in a transverse direction of the vehicle;
a fuel tank including a main tank body mounted under a driver's seat and an auxiliary tank body mounted on one lateral side of the engine in the transverse direction of the vehicle; and
a canister mounted adjacent to the engine on one lateral side of the engine and rearwardly of and adjacent to the auxiliary tank body,
wherein the main tank body is covered by the driver's seat from above, and the auxiliary tank body extends from a side portion of the driver's seat.

2. The work vehicle as claimed in claim 1, further comprising a battery unit mounted on the mounting surface rearwardly of the canister, and a muffler mounted on the mounting surface on the other lateral side of the engine.

3. The work vehicle as claimed in claim 1, wherein the main tank body has substantially the same width as the driver's seat.

4. The work vehicle as claimed in claim 1, wherein the auxiliary tank body has a unit in a top portion thereof that allows the fuel tank to be filled with fuel.

5. The work vehicle as claimed in claim 1, further comprising an outer pipe frame extending above the mounting surface to surround devices mounted on the mounting surface.

6. The work vehicle as claimed in claim 5, wherein control cables are housed in the outer pipe frame.

7. The work vehicle as claimed in claim 1, further comprising a transition section connecting the main tank body to the auxiliary tank body, wherein the transition section allows fuel introduced into the auxiliary tank body to pass into the main tank body, and the auxiliary tank body comprises an internal space arranged above each of:
a lower end of a filling pipe extending into the auxiliary tank body; and
each of the main tank body and the transition section.

8. A work vehicle comprising:
a vehicle frame extending between a pair of rear wheels;
a horizontal mounting surface defined in the vehicle frame in an area behind a driver's seat;
an engine arranged on the mounting surface at a central portion thereof in a transverse direction of the vehicle;
a fuel tank including a main tank body mounted under the driver's seat and an auxiliary tank body mounted on one lateral side of the engine in the transverse direction of the vehicle;
a canister mounted adjacent to the engine on one lateral side of the engine and rearwardly of and adjacent to the auxiliary tank body; and
a unit arranged at a top portion of the auxiliary tank body and comprising at least one of:
a fuel cap; and
a pipe having a fuel filling inlet.

9. The work vehicle as claimed in claim 8, wherein a retaining member is provided to hold down a transitional portion between the main tank body and the auxiliary tank body from above.

10. The work vehicle as claimed in claim 9, wherein the retaining member is formed as a partition extending transversely of the vehicle frame rearwardly of the driver's seat.

11. The work vehicle as claimed in claim 9, wherein the retaining member extends between right and left ROPS struts and is fixed to the ROPS struts.

12. The work vehicle as claimed in claim 8, wherein the auxiliary tank body includes a top portion positioned higher than the main tank body, in which the pipe having the fuel filling inlet formed at an upper end thereof extends through the top portion,
wherein a connecting port for a fuel-gas introducing passage is formed in the top portion for connecting the canister to the top portion, and
wherein the pipe has a lower end positioned lower than the connecting port and above the main tank body.

13. The work vehicle as claimed in claim 12, wherein the pipe has a lower end positioned below a level that is half of a level of the auxiliary tank body.

14. The work vehicle as claimed in claim 12, wherein a two-way valve is disposed in the fuel-gas introducing passage.

15. The work vehicle as claimed in claim 8, further comprising a transition section connecting the main tank body to the auxiliary tank body, wherein the transition section allows fuel introduced into the auxiliary tank body to pass into the main tank body, and wherein the auxiliary tank body comprises an internal space arranged above a lower end of the pipe and above each of the main tank body and the transition section.

16. A fuel system for a work vehicle comprising:
- a fuel tank including a main tank body mounted under a driver's seat and an auxiliary tank body mounted on one lateral side of an engine in the transverse direction of the vehicle;
- a canister mounted adjacent to the engine on one lateral side of the engine and rearwardly of and adjacent to the auxiliary fuel tank; and
- a fuel-gas introducing passage for connecting a top portion of the auxiliary tank body to the canister, wherein the top portion of the auxiliary tank body is positioned higher than the main tank body, and a fuel filling pipe extends through the top portion of the auxiliary tank body from the outside with a top end thereof acting as a fuel port and with a lower end thereof being positioned below the top portion of the auxiliary tank body.

17. The fuel system for the work vehicle as claimed in claim 16, wherein the lower end of the fuel filling pipe is positioned lower than a connecting port of the fuel-gas introducing passage formed in the top portion and above the main tank body.

18. The fuel system for the work vehicle as claimed in claim 17, wherein the lower end of the fuel filling pipe is positioned below a level that is half of a level of the auxiliary tank body.

19. The fuel system for the work vehicle as claimed in claim 17, wherein a two-way valve is disposed in the fuel-gas introducing passage.

* * * * *